(No Model.)
E. H. HAMILTON.
ANIMAL TRAP.
No. 263,512. Patented Aug. 29, 1882.
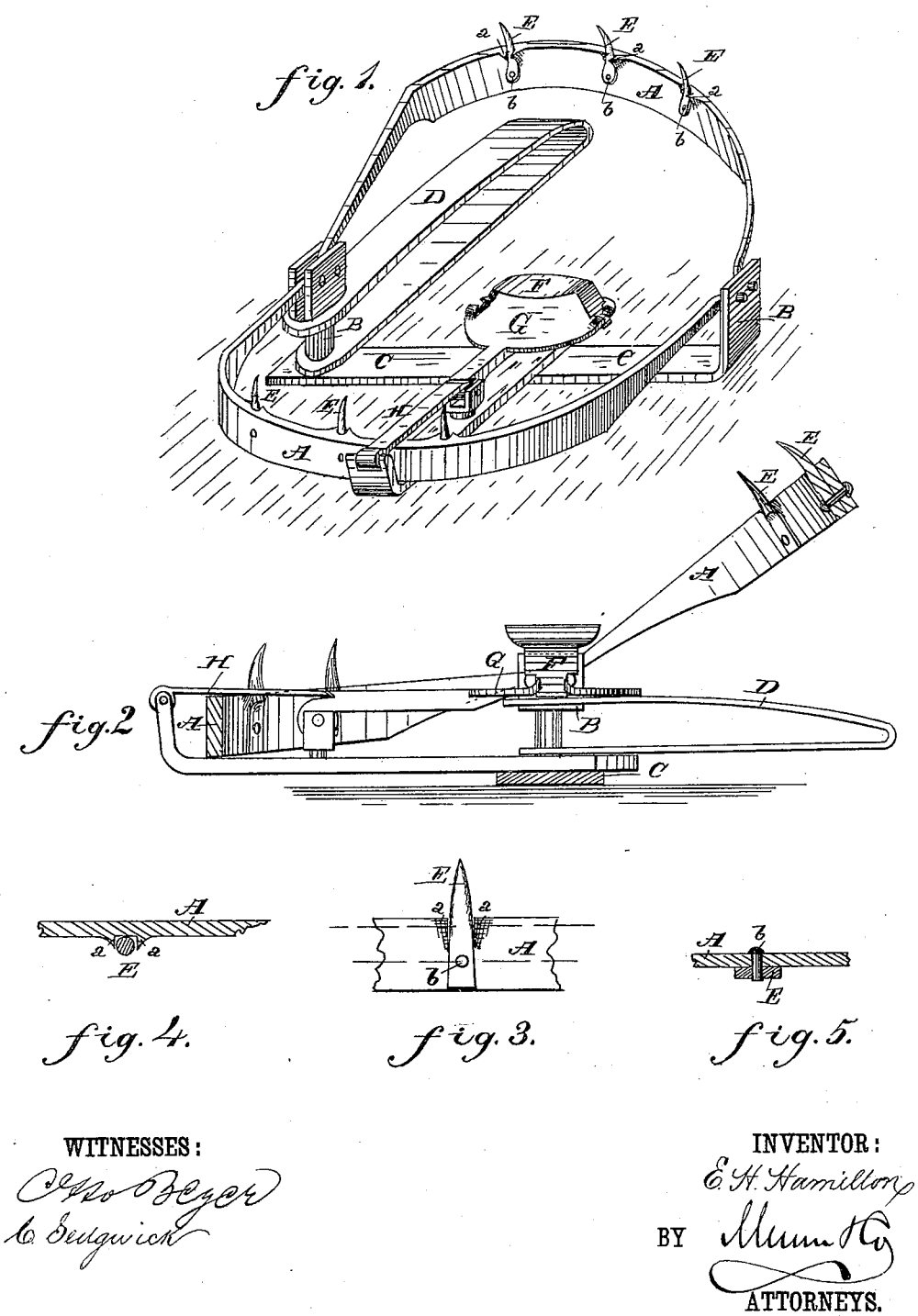
WITNESSES:
INVENTOR:
E. H. Hamilton
BY
ATTORNEYS.

UNITED STATES PATENT OFFICE.

ERASTUS H. HAMILTON, OF COMMUNITY, NEW YORK.

ANIMAL-TRAP.

SPECIFICATION forming part of Letters Patent No. 263,512, dated August 29, 1882.

Application filed May 31, 1882. (No model.)

*To all whom it may concern:*

Be it known that I, ERASTUS HAPGOOD HAMILTON, of Community, in the county of Madison and State of New York, have invented a new and Improved Animal-Trap, of which the following is a full, clear, and exact description.

The object of my invention is to provide a new and improved trap for catching otter and other animals.

The invention consists in the combination, with the jaws, of teeth riveted by a single rivet to the jaws at the base ends of the teeth, and of lugs projecting from the edges of the jaws at the sides of the teeth.

Reference is to be had to the accompanying drawings, forming part of this specification, in which similar letters of reference indicate corresponding parts in all the figures.

Figure 1 is a perspective view of my improved trap, showing it opened or set. Fig. 2 is a cross-sectional elevation of the same in the same position. Fig. 3 is a plan view of one of the teeth. Fig. 4 is a detail longitudinal sectional elevation of one of the jaws through the front end of a tooth. Fig. 5 is a similar longitudinal sectional elevation through the rear or inner end of the tooth.

Two jaws, A, are pivoted to short standards B at the ends of a base-plate, C, and are acted upon by a flat U-shaped spring, D, in the usual manner.

A series of sharp and strong teeth, E, are held by rivets $b$ at their base ends to the under sides of the jaws A in such a manner that they project from the adjoining edges of the jaws.

At the inner edges of the jaws a lug, $a$, is formed at each side of each tooth E, and these lugs project from the inner surfaces of the jaws. These lugs, in addition to the rivets $b$, hold the teeth in place. If any tooth becomes broken, it can easily be removed and replaced by another.

A platform or plate, or other suitable projection, F, is secured permanently or detachably on the top of the pan G of the trap in such a manner that it will be some distance higher above the ground than the upper edges of the jaws or their teeth when the trap is opened or set. The pan G and latch H are of the usual construction.

By removing the plate or projection on the pan this trap can be used to catch animals by the head, or paws, or feet, in the usual manner, but is especially adapted for catching otter by the belly as they slide down their snow-slides. The otter is very fond of sliding in this manner, and it is almost impossible to catch it on the slides in a smooth-jaw trap. They slide very rapidly, and their fur is so soft, sleek, and yielding that they slip out of ordinary traps; and the jaws must be provided with sharp teeth or spikes to catch the animals. The plate or projection F is provided on the pan G, so that the animal's belly will come in contact with the plate and spring the trap before the fur or belly of the animal catches on the teeth E, as thereby the trap would be upset before being sprung.

Having thus fully described my invention, what I claim as new, and desire to secure by Letters Patent, is—

In an animal-trap, the combination, with the jaws A, provided with lugs $a$, projecting from the inner edges, of the teeth E, fastened to the jaws A by rivets $b$, and passing in between two adjoining lugs, $a$, substantially as herein shown and described, and for the purpose set forth.

ERASTUS HAPGOOD HAMILTON.

Witnesses:
    GEO. R. KELLOGG,
    CLARKE FROST.